(12) United States Patent
Darcy, III et al.

(10) Patent No.: US 7,139,519 B2
(45) Date of Patent: Nov. 21, 2006

(54) WELDED POLYIMIDE INTERMEDIATE TRANSFER BELT AND PROCESS FOR MAKING THE BELT

(75) Inventors: John J. Darcy, III, Webster, NY (US); Scott J. Griffin, Fairport, NY (US); David W. Martin, Walworth, NY (US); Michael S. Roetker, Webster, NY (US); Felix J. Santana, Webster, NY (US)

(73) Assignee: Xerox Corporation, Stamford, CT (US)

( * ) Notice: Subject to any disclaimer, the term of this patent is extended or adjusted under 35 U.S.C. 154(b) by 19 days.

(21) Appl. No.: 10/884,289

(22) Filed: Jul. 2, 2004

(65) Prior Publication Data

US 2006/0002746 A1 Jan. 5, 2006

(51) Int. Cl.
*G03G 15/01* (2006.01)
*G03G 15/20* (2006.01)

(52) U.S. Cl. .................. 399/302; 399/308
(58) Field of Classification Search ........... 399/159, 399/161, 162, 164, 302, 308; 430/56, 130; 428/58

See application file for complete search history.

(56) References Cited

U.S. PATENT DOCUMENTS 5,606,396 A * 2/1997 Yu et al. ............... 399/162
2003/0008098 A1 * 1/2003 Yuan et al. ............ 428/58

* cited by examiner

*Primary Examiner*—Hoang Ngo
(74) *Attorney, Agent, or Firm*—Oliff, Berridge, PLC; Eugene Palazzo (57) ABSTRACT

A welded intermediate transfer belt and process for making the same having a substrate made primarily of at least one polyimide polymer. The weld may be ultrasonically or otherwise welded and may have favorable properties such as relatively thin seam thickness and small weld steps. The weld may be overlapped or miter cut.

34 Claims, 5 Drawing Sheets

WELDED POLYIMIDE INTERMEDIATE TRANSFER BELT AND PROCESS FOR MAKING THE BELT

CROSS-REFERENCE TO RELATED APPLICATIONS

Attention is directed to copending application U.S. patent application Ser. No. 10/825,453, filed Apr. 14, 2004, entitled, "Imageable Seamed Belts With Lignin Sulfonic Acid Doped Polyaniline." Reference is also made to commonly-assigned U.S. patent application Ser. No. 10/884,773, filed Jul. 2, 2004 (contemporaneously with this application), entitled Polyaniline Filled Polyimide Weldable Intermediate Transfer Components. The disclosure of these applications is hereby incorporated by reference in their entirety.

BACKGROUND AND SUMMARY

The present invention relates to intermediate transfer members, and more specifically, to intermediate transfer members useful in transferring a developed image in an electrostatographic, for example xerographic, including digital, image on image, and the like, machines or apparatuses. In embodiments, there are selected intermediate transfer members comprising a layer or substrate comprising a filled polymer, such as a filled polyimide, and for example, a polyaniline filled polyimide. In embodiments, a weldable intermediate transfer member dispenses with the need for puzzle cut seams, which are highly labor intensive. The net manufacturing cost to produce the weldable intermediate transfer members, in embodiments, is lowered. In embodiments, the weldable intermediate transfer members are imageable.

In a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Generally, the electrostatic latent image is developed by bringing a developer mixture into contact therewith. The developer mixture can comprise a dry developer mixture, which usually comprises carrier granules having toner particles adhering triboelectrically thereto, or a liquid developer material, which may include a liquid carrier having toner particles, dispersed therein. The developer material is advanced into contact with the electrostatic latent image and the toner particles are deposited thereon in image configuration. Subsequently, the developed image is transferred to a copy sheet. It is advantageous to transfer the developed image to a coated intermediate transfer web, belt or component, and subsequently transfer with very high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential between the imaging member and the intermediate transfer member, the transfer of the toner particles to the intermediate transfer member and the retention thereof should be as complete as possible so that the image ultimately transferred to the image receiving substrate will have a high resolution. Substantially 100% toner transfer occurs when most or all of the toner particles comprising the image are transferred and little residual toner remains on the surface from which the image was transferred.

Intermediate transfer members allow for positive attributes such as enabling high throughput at modest process speeds, improving registration of the final color toner image in color systems using synchronous development of one or more component colors using one or more transfer stations, and increasing the range of final substrates that can be used. However, a disadvantage of using an intermediate transfer member is that a plurality of transfer steps is required allowing for the possibility of charge exchange occurring between toner particles and the transfer member which ultimately can lead to less than complete toner transfer. The result is low-resolution images on the image receiving substrate and image deterioration. When the image is in color, the image can additionally suffer from color shifting and color deterioration. In addition, the incorporation of charging agents in liquid developers, although providing acceptable quality images and acceptable resolution due to improved charging of the toner, can exacerbate the problem of charge exchange between the toner and the intermediate transfer member.

Attempts at controlling the resistivity of intermediate transfer members have been accomplished by, for example, adding conductive fillers such as ionic additives and/or carbon black to the outer layer. For example, U.S. Pat. No. 6,397,034 discloses use of fluorinate carbon filler in a polyimide intermediate transfer member layer.

Use of polyaniline filler in a polyimide has been disclosed in U.S. Pat. No. 6,602,156. However, the patent discloses a polyaniline filled polyimide puzzle cut seamed belt. The use of the polyaniline filled polyimide puzzle cut seamed belt provides a belt, which has improved mechanical and electrical properties over other filled belts. However, manufacture of the puzzle cut seamed belt is labor intensive and very costly, and the puzzle cut seam, in embodiments, is sometimes weak. The manufacturing process for a puzzle cut seamed belt requires a lengthy high temperature and high humidity-conditioning step. For the conditioning step, each individual belt is rough cut, rolled up, and placed in a conditioning chamber that is environmentally controlled at 45° C. and 85 percent relative humidity, for approximately 20 hours. Another 3 hours is required to bring the belt back down to ambient conditioning to prevent condensation and watermarks before it can be removed from the conditioning chamber. This conditioning operation is required to bring the belt into the proper resistivity range for use in a color printer. The conditioning step necessitates that sheets of the belt material be cut roughly to size prior to conditioning. This makes it virtually impossible to automate the manufacturing process for puzzle cut seamed belts. Without the 24-hour high temperature and high humidity conditioning step, the belt's electrical properties and hence image quality, will not be stable for several months.

Also, after the 1-day high temperature and high humidity-conditioning step, puzzle cut seamed belts are then additionally prepared by using tape or glue at the seam. This step is followed by the highly labor intensive step of having an operator manually zip the puzzle cut pieces together with their fingers. Once seamed, the strength of the puzzle cut seam is limited by the strength of the puzzle cut piece necks. Most belt break failures occur when the puzzle necks break.

Smaller circumference intermediate transfer belts are made by extrusion or spin casting. However, extrusion and spin casting are not cost effective for belts requiring larger circumferences. Larger circumference belts are necessary in color tandem engine architecture machines.

Therefore, it is desired to provide a welded intermediate transfer belt that does not have puzzle cut seams, but instead, has a welded seam, thereby providing a belt that can be manufactured without such labor intensive steps as manually piecing together the puzzle cut seam with fingers, and without the lengthy high temperature and high humidity conditioning steps. Further, it is desired to provide a belt that has a stronger seam than current puzzle cut seams. It is also desired to provide a higher circumference weldable belt for color machines.

One embodiment of the present invention is an intermediate transfer belt, comprising: a belt substrate comprising primarily at least one polyimide polymer; and a welded seam.

Another embodiment of the present is a process for welding an intermediate transfer belt comprising primarily at least one polyimide polymers, comprising: mounting two end sections of an unseamed polyimide belt in proximity to an ultrasonic welding horn; moving the ultrasonic welding horn into physical contact with at least one of the end sections; and imparting sufficient energy, with the ultrasonic horn, to raise temperatures within at least a portion of the end sections above the glass transition temperature of the polyimide polymer.

Yet another embodiment of the present invention is an apparatus for forming images on a recording medium comprising: a charge-retentive surface to receive an electrostatic latent image thereon; a development component to apply toner to said charge-retentive surface to develop said electrostatic latent image and to form a developed image on said charge retentive surface; an intermediate transfer belt, comprising a belt substrate comprising primarily at least one polyimide polymer; and a welded seam; and a fixing component.

BRIEF DESCRIPTION OF THE DRAWINGS

For a better understanding of the present invention, reference may be had to the accompanying figures.

DETAILED DESCRIPTION

Herein are described intermediate transfer members comprising polyaniline filled polyimide layers or substrates. In embodiments, the polyaniline filler has a relatively small particle size. In embodiments, the resistivity of the intermediate transfer member is relatively high.

The intermediate transfer members are weldable and do not require the presence of puzzle cut seams. Instead, the seam of the polyaniline filled polyimide belt is weldable. Also, the weldable polyaniline filled polyimide belts do not require a conditioning step, and may be ultrasonically welded to produce a seam that is as strong or stronger than the polyaniline filled polyimide material itself. The formulation of polyaniline filled polyimide conditions fully at room temperature and humidity within several hours. Consequently, no high temperature and high humidity conditioning is necessary. Also, an entire roll of polyaniline filled polyimide can be loaded into an automated manufacturing device such as an automated ultrasonically welded seam manufacturing line. Consequently, weldable polyaniline filled polyimide belts can be made at a much lower cost than traditional puzzle cut seamed polyimide belts, and other seaming technologies. The present inventors have found that varying the proportion of polyaniline controls the sheet resistivity and can be set to match current intermediate transfer belt properties or to satisfy the requirements for a future intermediate transfer belt. In addition, the present inventors have determined that varying the average particle size of the polyaniline varies the roughness of the material's surface.

In addition, the current weldable polyaniline filled polyimide belts dispense with the requirement for use of carbon blacks and other fillers, although in embodiments, carbon black or other fillers can be added.

Figure 1:
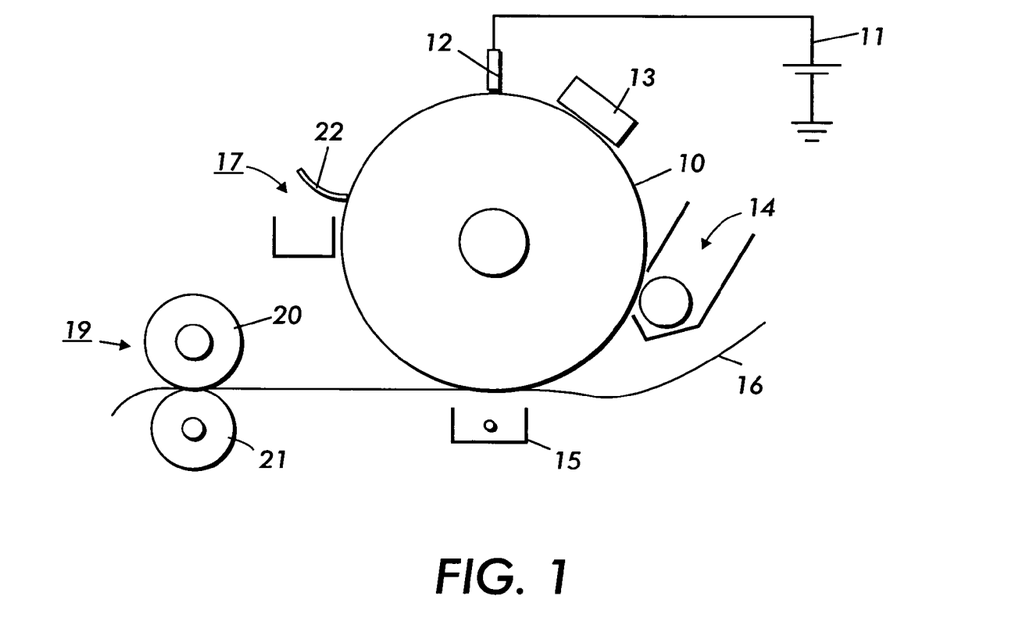
FIG. 1 is an illustration of a general electrostatographic apparatus.

Referring to FIG. 1, in a typical electrostatographic reproducing apparatus, a light image of an original to be copied is recorded in the form of an electrostatic latent image upon a photosensitive member and the latent image is subsequently rendered visible by the application of electroscopic thermoplastic resin particles, which are commonly referred to as toner. Specifically, photoreceptor 10 is charged on its surface by means of a charger 12 to which a voltage has been supplied from power supply 11. The photoreceptor is then imagewise exposed to light from an optical system or an image input apparatus 13, such as a laser and light emitting diode, to form an electrostatic latent image thereon. Generally, the electrostatic latent image is developed by bringing a developer mixture from developer station 14 into contact therewith. Development can be effected by use of a magnetic brush, powder cloud, or other known development process.

After the toner particles have been deposited on the photoconductive surface, in image configuration, they are transferred to a copy sheet 16 by transfer means 15, which can be pressure transfer or electrostatic transfer. Alternatively, the developed image can be transferred to an intermediate transfer member and subsequently transferred to a copy sheet.

After the transfer of the developed image is completed, copy sheet 16 advances to fusing station 19, depicted in FIG. 1 as fusing and pressure rolls, wherein the developed image is fused to copy sheet 16 by passing copy sheet 16 between the fusing member 20 and pressure member 21, thereby forming a permanent image. Photoreceptor 10, subsequent to transfer, advances to cleaning station 17, wherein any toner left on photoreceptor 10 is cleaned therefrom by use of a blade 22 (as shown in FIG. 1), brush, or other cleaning apparatus.

Figure 2:
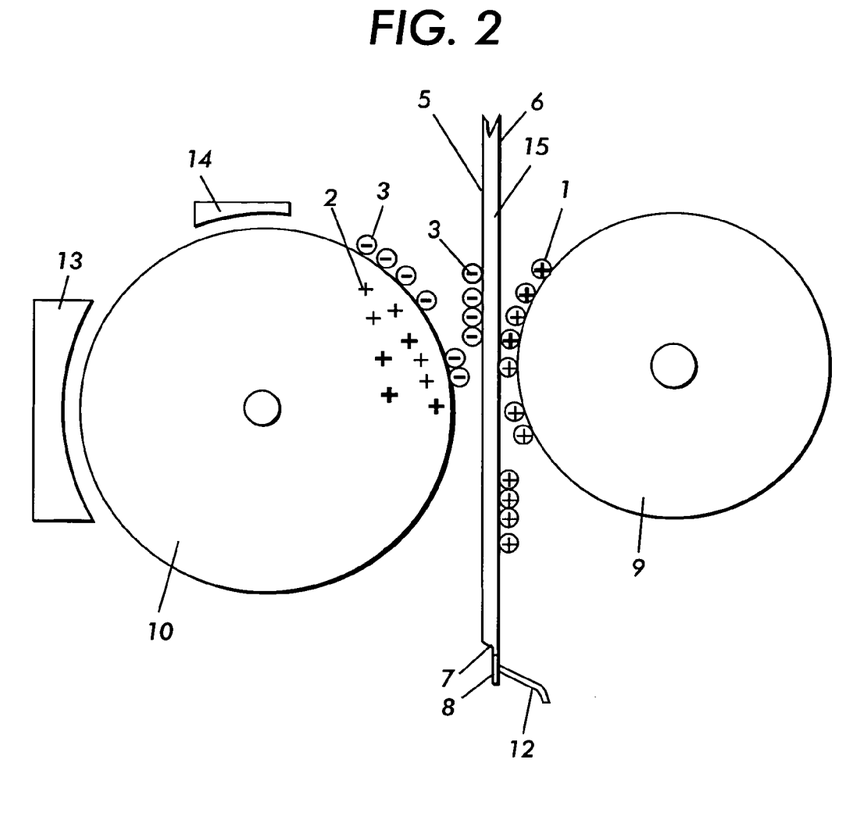
FIG. 2 is a schematic view of an image development system containing an intermediate transfer member.

FIG. 2 demonstrates an embodiment of the present invention and depicts an intermediate transfer member 15 positioned between an imaging member 10 and a transfer roller 9. The imaging member 10 is exemplified by a photoreceptor drum. However, other appropriate imaging members may include other electrostatographic imaging receptors such as ionographic belts and drums, electrophotographic belts, and the like.

In the multi-imaging system of FIG. 2, each image being transferred is formed on the imaging drum by image forming station 13. Each of these images is then developed at developing station 14 and transferred to intermediate transfer member 15. Each of the images may be formed on the photoreceptor drum 10 and developed sequentially and then transferred to the intermediate transfer member 15. In an alternative method, each image may be formed on the photoreceptor drum 10, developed, and transferred in registration to the intermediate transfer member 15. In a preferred embodiment of the invention, the multi-image system is a color copying system. In this color copying system, each color of an image being copied is formed on the photoreceptor drum 10. Each color image is developed and transferred to the intermediate transfer member 15. In the alternative method, each color of an image may be formed on the photoreceptor drum 10, developed, and transferred in registration to the intermediate transfer member 15.

Subsequent to development, the charged toner particles 3 from the developing station 14 are attracted and held by the photoreceptor drum 10 because the photoreceptor drum 10 possesses a charge 2 opposite to that of the toner particles 3. In FIG. 2, the toner particles are shown as negatively charged and the photoreceptor drum 10 is shown as positively charged. These charges can be reversed, depending on the nature of the toner and the machinery being used. In a preferred embodiment, the toner is present in a liquid developer. However, the present invention, in embodiments, is useful for dry development systems also.

A biased transfer roller 9 positioned opposite the photoreceptor drum 10 has a higher voltage than the surface of the photoreceptor drum 10. Biased transfer roller 9 charges the backside 6 of intermediate transfer member 15 with a positive charge. In an alternative embodiment of the invention, a corona or any other charging mechanism may be used to charge the backside 6 of the intermediate transfer member 15.

The negatively charged toner particles 3 are attracted to the front side 5 of the intermediate transfer member 15 by the positive charge 1 on the backside 6 of the intermediate transfer member 15.

The intermediate transfer member may be in the form of a sheet, web or belt as it appears in FIG. 2, or in the form of a roller or other suitable shape. In a preferred embodiment of the invention, the intermediate transfer member is in the form of a belt. In another embodiment of the invention, not shown in the Figures, the intermediate transfer member may be in the form of a sheet.

After the toner latent image has been transferred from the photoreceptor drum 10 to the intermediate transfer member 15, the intermediate transfer member may be contacted under heat and pressure to an image receiving substrate such as paper. The toner image on the intermediate transfer member 15 is then transferred and fixed, in image configuration, to a substrate such as paper.

Figure 3:
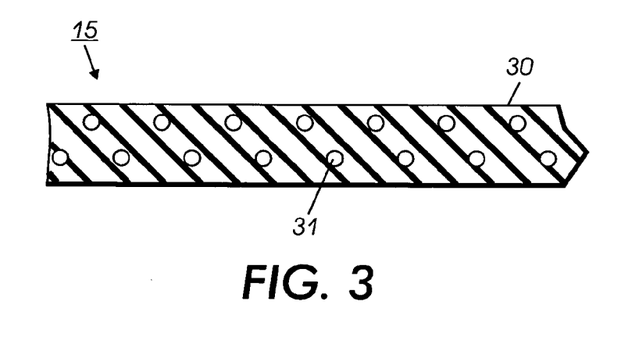
FIG. 3 is an illustration of an embodiment, wherein the substrate of the intermediate transfer member comprises a polyaniline filled polyimide material.

FIG. 3 shows a sectional view of an example of an intermediate transfer member 15 according to an embodiment of the present invention and depicts a substrate 30. The polyaniline fillers 31 are depicted as being in a dispersed phase in the polyimide material. The intermediate transfer member 15 can be a single layer as shown in FIG. 3, wherein the substrate comprises the polyaniline filled polyimide or it can be several layers, for example from about 2 to about 5, of a polyaniline filled polyimide material.

Figure 5:
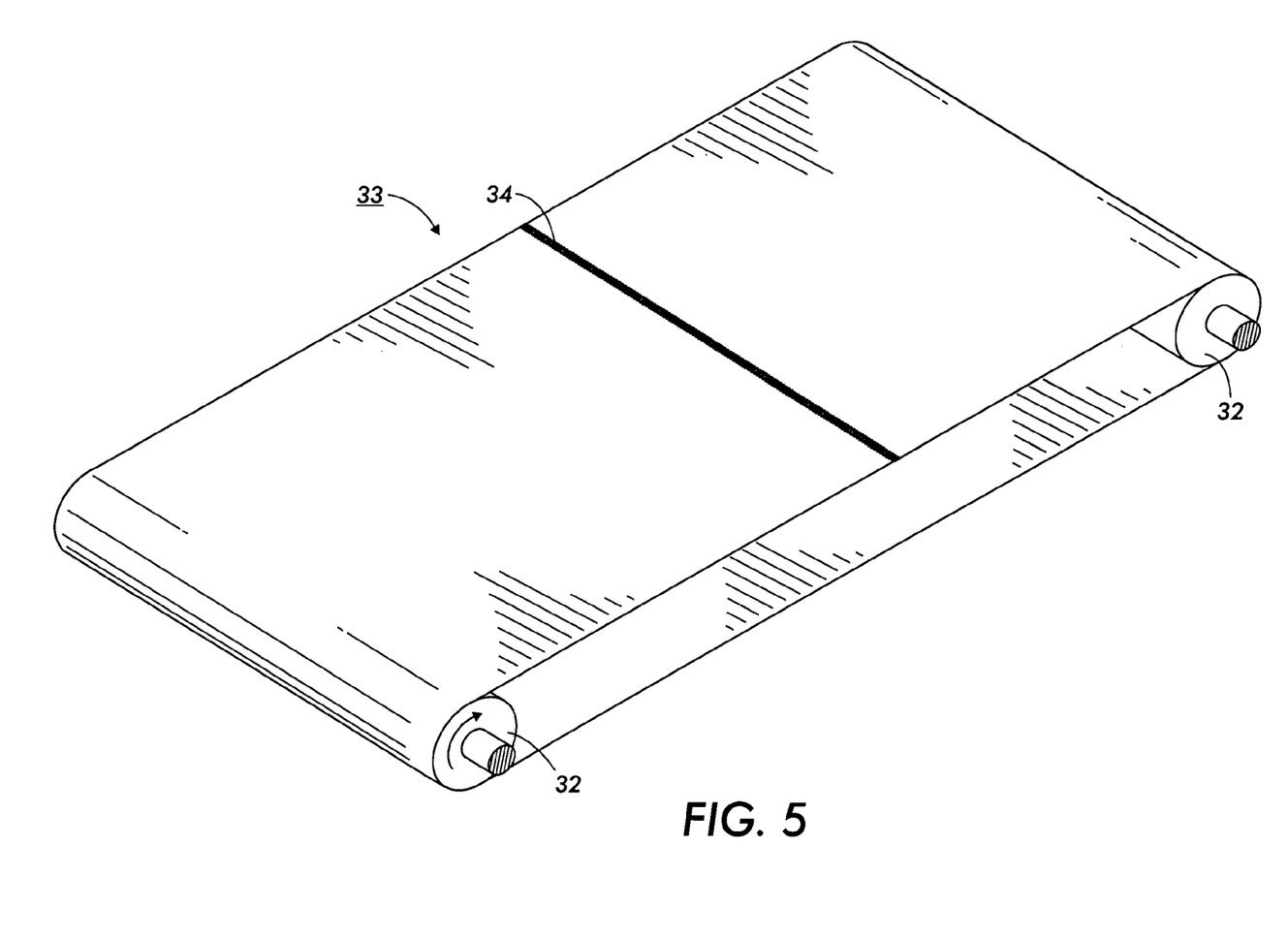
FIG. 5 is an illustration of a welded belt.

FIG. 5 shows one embodiment of an intermediate transfer belt 33 with welded seam 34. Belt 33 is positioned around rollers 32. The term "weldable", refers to a material that will melt and adhere to itself, and in embodiments, form a strong mechanical bond. The melting can be induced by welding energy sources. including, without limitation, direct heating with a warmed platen, indirect heating with infrared lamps, e-beam, a laser, or any other method of irradiation. FIG. 5 shows intermediate transfer belt 33 with welded seam 34. Belt 33 is positioned around rollers 32. Processes for welding seamed flexible imaging belts are not new. See, e.g., U.S. Pat. No. 6,328,922 and U.S. Pat. No. 6,197,461. See also, U.S. patent application Ser. No. 10/063,971, entitled Improved Flexible Imaging Member Seam Treatment; U.S. patent application Ser. No. 10/063,973, entitled Flexible Imaging Member Seam Treatment Article and Preparation Method Thereof; and U.S. patent application Ser. No. 10/871,208, entitled Laser Welded Photoreceptor Belts with Quartz Pressure Plate Welding Seam Control, filed on Jun. 18, 2004. Each of these is hereby incorporated herein in their entirety. Known welding techniques include pressure heat fusing, laser heat welding, solvent welding, and, most commonly, ultrasonic welding. Heretofore, however, it has not been possible to weld intermediate transfer imaging belts comprised primarily of polyimide polymers for the reasons described above.

Figure 6:
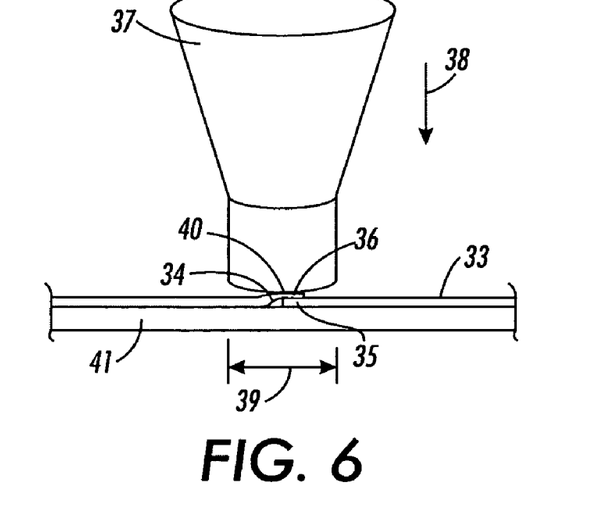
FIG. 6 is a schematic cross-sectional view of an unwelded intermediate transfer belt mounted on a welding station.

One embodiment of a suitable process for welding a polyimide-based intermediate transfer belt (ITB) is described in relation to FIG. 6. Such an ultrasonic welding process is adapted from similar processes known to work in relation to photoreceptor belts. In FIG. 6, belt 33 (not shown in its entirety), comprises overlapped end sections 36 and 35. Prior to seaming, end sections 35 and 36 are overlapped by between about 200 µm to about 500 µm and preferably about 270 µm to about 330 µm or about 300 µm. End sections 35 and 36 are held in place during the seaming operation by a holding means (not shown), typically including application of a vacuum on portions of belt 33 spaced in proximity to but apart from the area of seam 34.

In the embodiment shown in FIG. 6, welding energy is provided by ultrasonic welding horn 37. In order for the weld to occur, sufficient energy must be imparted in the correct location to raise temperatures in the weld zone (indicated by space 39 in FIG. 6) above the glass transition temperature of the polyimide ITB material. For ultrasonic welding in the embodiment shown in FIG. 6, the amount of energy imparted within welding zone 39 is controlled by the amplitude of the signal, the frequency of the signal, and the proximity of the horn to welding zone 39, including proximity along the width of welding zone 39 and proximity to upper weld surfaces within welding zone 39. For a polyimide with a glass transition temperature of about 725° F., sufficient energy can be imparted with an appropriate welding horn in physical contact with overlap end section 36 at frequencies ranging from about 20 KHz to about 60KHz, and preferably, from about 30 KHz to about 50 KHz, or about 40 KHz. Signal amplitudes or stroke length of the welding horn may range from 0.2 mils (0.0002 inches) to about 2 mils or preferably from about 0.5 mils to about 1.5 mils, or about 0.8 mils. When the horn is moved along seam 34 at a rate ranging from about 0.1 inches/second to about 0.6 inches/second, or, preferably, about 0.2 to about 0.4 inches/second or about 0.3 inches/second, it is believed that signals having the above characteristics impart sufficient vibrational energy to cause enough friction in end sections 35 and 36 to raise temperatures in at least a portion of weld zone 39 above glass transition temperatures in the range of about 680° F. to about 750° F., or preferably about 725° F.

In order to create a uniform, durable and relatively smooth weld, other factors in addition to the above welding parameters become important. One such factor is the effective width of the sonic signal imparted by horn 37. In FIG. 6, horn 37 is shown having a physical width at its sonic bell approximately equal to the width of weld zone 39. Weld zone 39, in this embodiment, includes both the overlap zone of end sections 35 and 36 plus an area on either side of the overlap zone that encompasses the weld splash zone resulting from welding within the overlap zone. Whatever the physical dimension of the sonic bell, it is believed that proper welding requires that sufficient energy to surpass the glass transition temperature should be imparted at least over the entire overlap zone and, preferably, over the weld splash zone as well.

Another factor in yielding a satisfactory weld for intermediate transfer belts is control of the weld pile, or height of the belt within the seam area. Such control of the weld pile often includes control of weld splash, since uncontrolled or misdirected weld splash may result in an increased weld pile or weld roughness. The higher or rougher the weld pile, the more friction between the weld portion of the intermediate transfer belt and rollers, cleaning blades or brushes, and other members that contact the intermediate transfer belt. Minimizing such friction extends component life and performance, thereby reducing system maintenance cost and improving system performance.

In the embodiment shown in FIG. 6, pile height and weld splash are controlled by direct contact between horn 37 and at least one of overlapped end sections 36 and 35. As discussed above, such direct contact increases energy transfer between horn 37 and weld zone 39. When horn 37 is also provided with a landing zone 40 that provides a profile essentially horizontal to support platen 41 across the entire weld zone 39, then such horizontal landing zone 40 of horn 37 can provide effective control of weld pile height and weld splash. Specifically, for a polyimide intermediate belt substrate having a material thickness of 80 μm +/−5 μm (equal to 3.2 mils +/−0.02 mils), landing zone 40 may be located between from about 1.99 mils to about 2.01 mils and, preferably, about 2.0 mils above the thickness of end section 35 (or about 130 μm +/−6 μm (3.28 mils +/−0.01 mils) above platen 41. Such a fly height above weld zone 39 in effect "plows", flattens, and somewhat spreads the weld pile and weld splash formed as end sections 35 and 36 reach and exceed their glass transition temperature. Horn 37, with its bell 40, may be rigidly fixed above weld zone 39 or may float with a biasing pressure force shown in FIG. 6 by arrow 38. An appropriate biasing force to create a desirable weld may range from about 1 to about 6 lbs., or preferably from about 2 to about 4 pounds or about 3 pounds.

Figure 7:
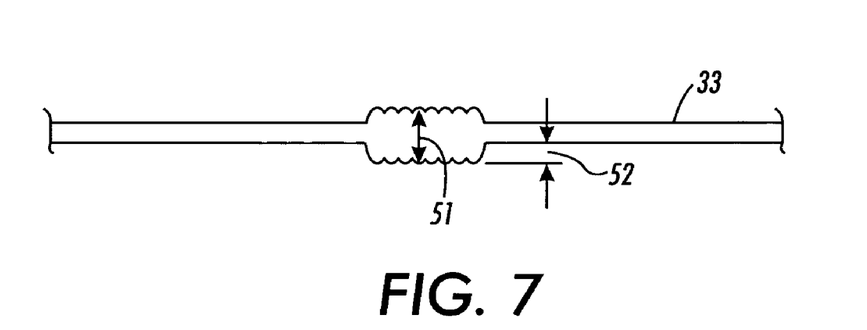
FIG. 7 is a cross-sectional view of the weld of an intermediate transfer belt made by welding overlapping end sections.

As shown in FIG. 7, the result using the above approximately 80 μm polyimide-based substrate material is a weld seam thickness 51 from about 110 μm to about 130 μm thick and, preferably, about 120 μm thick. This translates to a seam thickness exceeding the substrate thickness by between about 30 to about 50 μm or, preferably, about 40 μm. As percentages, the seam thickness may range from about 137 percent to about 163 percent, or, preferably, about 150 percent of the original substrate thickness. The weld step 52 (the height of the weld seam) over the substrate base may range from about 20 μm to about 45 μm above the substrate base, and, preferably, an amount not exceeding about 35 μm over the substrate base. As a percent of substrate base thickness, this translates to a weld step 52 ranging from about 25 percent to about 57 percent, or, preferably, about 44 percent of substrate base above the substrate base.

Another factor in making a good weld is removal of as much heat as possible as soon as an acceptable weld has been formed. Without such heat removal, heat bubbles and uncontrolled flow of the weld renders the weld seam uneven, less durable, and prone to cause increased friction. In the embodiment shown in FIG. 6, heat removal is accomplished by placing horn 3 in contact with the weld seam and by making horn 37 from thermally conductive materials having thermal conductivity parameters greater than about 230 W/M degrees Centigrade and preferably above 245 W/M degrees Centigrade. Examples of such materials are many alloys of copper, gold, diamond, and aluminum. Because of the highly abrasive use of the horn as it impacts end sections 35 and 36, comparatively abrasive-resistant materials such as diamond and certain aluminum alloys are preferred. Experience has shown that aluminum alloy 6061 T6 is adequate for this purpose.

Figure 8:
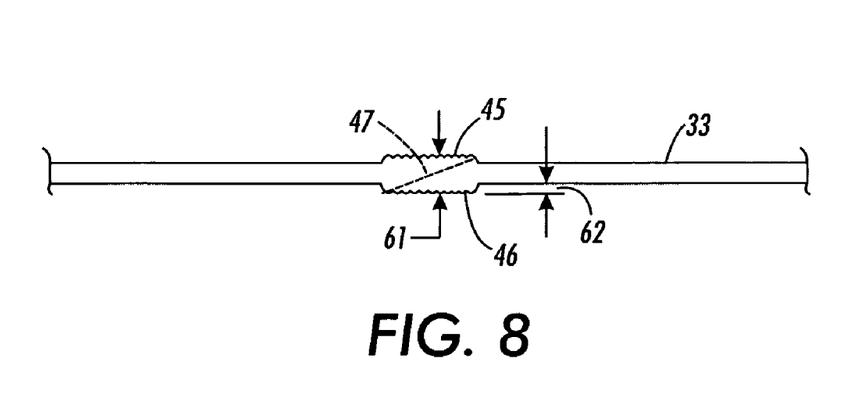
FIG. 8 is a cross-sectional view of the weld of an intermediate transfer belt made by welding miter cut end sections.

Another embodiment of the invention is shown in FIG. 8. In this embodiment, end sections 45 and 46 have been miter cut and joined prior to welding. This contrasts to the simple overlap seam shown in FIGS. 6 and 7. Although the seam in FIG. 8 has already been welded in a process similar to that disclosed in FIG. 6, the miter cut that preceded the welding is shown by dotted line 47. After an effective weld, the zone between end sections 45 and 46 along line 47 should be nearly undetectable. The advantage of miter cutting end sections 45 and 46 is that weld seam thickness 61 and weld step 62 are smaller than comparable weld seam thickness 51 and weld step height 52 shown in FIG. 7. Specifically, for a base substrate having a thickness of about 80 μm +/−5 μm, a miter cut weld seam may have a weld seam thickness ranging from about 100 μm to about 120 μm, and preferably about 110 μm. As a percentages, the seam thickness may range from about 125 percent to about 150 percent, or, preferably, about 138 percent of the original thickness. Weld step height in this example may range from about 15 μm to about 40 μm, or preferably by an amount not exceeding 20 μm. As a percent of substrate base thickness, this translates to a weld step 62 ranging form about 18 to about 50 percent, or, preferably, about 25 percent of the substrate base thickness.

As described above, welding processes such as the ultrasonic welding process described above, are significantly cost effective because of the ability to avoid puzzle cut seaming operations, time-consuming conditioning steps, and application of additional fillers. Welded belt 33, in embodiments, also has a relatively smooth seam even without subsequent finishing. An advantage of such smooth seams is that blade cleaning over a smooth surface is much better than over a bumpy surface or bumpy seam. With lower friction, cleaning blade cycle life is also enhanced. As is known in the art, a smooth surface over a seam can also be achieved, in embodiments, by adding a coating on the belt over the seam. As is known in the art, such coatings and smoothing can render yield a belt with an imageable seam. One such seam coating known to impart satisfactory mechanical, adhesion, and smoothness qualities is a coating comprising polyvinyl chloride. The properties of PVC can be further tuned by modification of the molecular weight, the functional groups, or by the addition of a co-polymer. The electrical properties of an imageable seam coating are achieved by the addition of a conductive polymer such as polyanaline. It should be noted that the processes described above for ultrasonically welding and finishing intermediate transfer belts, with appropriate adjustments, have been adapted for welding and finishing seams on various photoreceptor belts.

One class of embodiments of the substrate for weldable polyimide intermediate transfer belts comprises polyaniline filled polyimide substrates. Such substrates can comprise a polyimide having a suitable high tensile modulus, and in embodiments, the polyimide is one that is capable of becoming a conductive film upon the addition of electrically conductive particles. In embodiments, the polyimide is one having a high tensile modulus, because the high tensile modulus optimizes the film stretch registration and transfer conformance.

Several types of thermoplastic, weldable polyimides can be purchased commercially. These include KAPTON®, available from E.I. DuPont, IMIDEX® from West Lake Plastics Company, and the like thermoplastic polyimides. There are several grades of polyimide available for purchase and include HN, FN, MTB, FPC, JB, RR, VN, KJ, JP, and the like. In embodiments, KAPTON® KJ can be used as the polyimide. The KJ grade of polyimide has sufficient oxygen molecules inserted along the backbone of the polymer chain to allow it to rotate and thus, be weldable. In addition, the KJ grade polyimide has a proper conductivity range for toner transfer. Use of polyaniline as the filler can bring the composition into the desired range of resistivity for toner transfer of a weldable intermediate transfer belt.

Most commercially available poyimides do not exhibit a glass transition temperature (Tg), because the polymer decomposes at elevated temperatures about 400° C. Accordingly, these polyimide polymers are termed thermoset plastic. Therefore, they can not be ultrasonically welded into seamed flexible belts. However, modified thermoplastic polyimides can transform polyimide polymers from a thermoset plastic into a thermoplastic that can accordingly be ultrasonically weldable into seamed belts. Specific examples of suitable thermoplastic polyimides are represented by the following formulas:

wherein n, m and q are numbers and represent the degree of polymerization, and are from about 10 to about 300, or from about 50 to about 125; x and y are numbers and represent the number of segments and are from about 2 to about 10, or from about 3 to about 7; and z is a number and represents the number of repeating units and is from about 1 to about 10, or from about 3 to about 7.

One particular embodiment of a weldable intermediate transfer belt comprises polyaniline fillers in the thermoplastic polyimide polymer. The use of the polyaniline dispenses with the need for nanoparticles and/or carbon black and/or other fillers normally necessary in intermediate transfer belts to obtain the desired resistivity. One of the reasons there is no need for additional fillers is because of the method of reaction between the polyaniline and polyimide, which results in the present polyaniline-filled polyimide weldable belt as a single, homogeneous material. The term "homogeneous" refers to the entire layer having the same average composition as opposed to a device that has distinct layers such as a supporting substrate and a separate conducting layer. However, in embodiments, a filler, such as carbon black, may be added.

The thermoplastic polyimide is present in the polyaniline filled polyimide substrate in an amount of from about 75 to about 98 percent by weight of total solids, or from about 86 to about 95, or from about 90 to about 92 percent by weight of total solids. Total solids include the total percentage by weight (equal to 100%) of polyimide, polyaniline, any additional fillers and any additives in the layer. The polyaniline is present in the polyimide in an amount of from about 2 to about 25 percent, or from about 5 to about 14 percent, or from about 8 to about 10 percent.

In embodiments, the polyaniline has a relatively small particle size of from about 0.5 to about 5.0 microns, or from about 1.1 to about 2.3 microns, or from about 1.2 to about 2.0 microns, or from about 1.5 to about 1.9, or about 1.7 microns. In order to achieve this small particle size, the polyaniline filler may need to be subjected to a grinding step. Polyaniline fillers can be purchased commercially from Panipol Oy, Finland, and other vendors.

In embodiments, an additional filler, other than polyaniline can be used, although it is not necessary. In embodiments, a carbon filler, such as carbon black, graphite, fluorinated carbon black, or other carbon fillers, can be used. The amount of carbon black filler in the polyaniline-filled polyimide weldable substrate is from about 1 to about 20 percent, or from about 2 to about 10 percent, or from about 3 to about 5 percent by weight of total solids.

The intermediate transfer member can be of any suitable configuration. Examples of suitable configurations include a sheet, a film, a web, a foil, a strip, a coil, a cylinder, a drum, an endless strip, a circular disc, a belt including an endless belt, an endless seamed flexible belt, and an endless seamed flexible belt. The circumference of the component in a film or belt configuration of from 1 to 2 or more layers is from about 250 to about 2,500 mm, or from about 1,500 to about 2,500 mm, or from about 2,000 to about 2,200 mm. The width of the film or belt is from about 100 to about 1,000 mm, or from about 200 to about 500 mm, or from about 300 to about 400 mm.

Roughness can be characterized by microgloss, wherein a rougher surface has a lower microgloss than a smoother surface. The microgloss values of the weldable polyaniline filled polyimide intermediate transfer belt from about 85 to about 110 gloss units, or from about 90 to about 105 gloss units, or from about 93 to about 98 gloss units. These measurements were taken at an 85° angle. An additional benefit of the polyaniline-filled polyimide weldable belt is that such an improved surface gloss achieved by the belt cannot be achieved when certain fillers other than polyaniline, for example, nanoparticles, are added to the polymer blend. The present belt, in embodiments, achieved the desired high gloss level without the need for additional fillers. Microgloss is a measure of the amount of light reflected from the surface at a specific angle and can be measured with commercial equipment such as the Micro-TR1-gloss instrument from BYK Gardner.

Specific embodiments of weldable polyimide substrate materials will now be described in detail. These examples are intended to be illustrative, and the invention is not limited to the materials, conditions, or process parameters set forth in these embodiments. All parts are percentages by weight of total solids unless otherwise indicated.

EXAMPLE 1

Preparation of Weldable KAPTON® KJ Thermoplastic Polyaniline Filled Polyimide Intermediate Transfer Belts A flexible seamed polyimide belt was prepared, using a rectangular cut sheet of a 4-mil thick KAPTON® KJ, a thermoplastic polyimide having a thermal contraction coefficient of $6.2 \times 10^{-5}/°$ C., a Glass Transition Temperature (Tg) of 210° C. (available from E.I. Du Pont de Nemours and Company), by overlapping the 2 opposite ends and ultrasonically welded, using 40 KHz frequency, into a seamed flexible polyimide belt. The molecular structure of this polyimide is given in formula (I) below:

(I)

wherein, x=2 and y=2; and m and n are from about 10 to about 300.

EXAMPLE 2

Preparation of Weldable Polyaniline Filled IMIDEX® Thermoplastic Polyimide Intermediate Transfer Belts Another flexible polyimide seamed belt was prepared in accordance to the seamed welding procedures described in Example 1, except that an alternate 4-mil thick thermoplastic polyimide, IMIDEX® (available from West Lake Plastics Company), having a thermal contraction coefficient of $6.1 \times 10^{-5}/°$ C., a Glass Transition Temperature (Tg) of 230° C., was used as the substrate. The molecular structure of IMIDEX® polyimide is shown in formula (II) below:

wherein z=1, and q is from about 10 to about 300.

EXAMPLE 3

Preparation of Known Thermoset Polyimide Intermediate Transfer Belts

Commercially available polyimides, such as KAPTON® F, H, and R types available from DuPont and UPILEX® R and S types available from Ube Industries, LTD are thermoset polyimide and have excellent temperature stability beyond 400° C. The molecular structures of these thermoset polyimide substrates are presented in the following formulas (III), (IV), and (V):

imides are thermoset plastics, so they can not conveniently be ultrasonically welded into seamed flexible belts.

EXAMPLE 4

Preparation of Weldable Polyaniline Filled Thermoplastic Polyimide Intermediate Transfer Belts A weldable intermediate transfer belt was prepared as follows. A sample was cut to a size of 362 mm wide by 2111.8 mm long. The ends were overlapped by one milliwhere n is a number of from about 10 to about 300.

With a thermal contraction coefficient of about $1.7 \times 10^{-5}/°$C. to about $2.5 \times 10^{-5}/°$C., it is almost 3.5 times greater than that of the KAPTON® KJ or IMIDEX®. The above polymeter and a ultrasonic horn was used to compress the material against a steel welding platen, melting the material in the overlap region and creating a seam. The resulting belt was 362 mm wide and 2,110.8 mm in circumference. The intermediate transfer belt comprised 91% KAPTON® KJ and 9% polyaniline. The polyaniline had a particle size of 1.7 microns.

EXAMPLE 5

Conditioning Trials for Weldable Intermediate Transfer Belts

Figure 4:
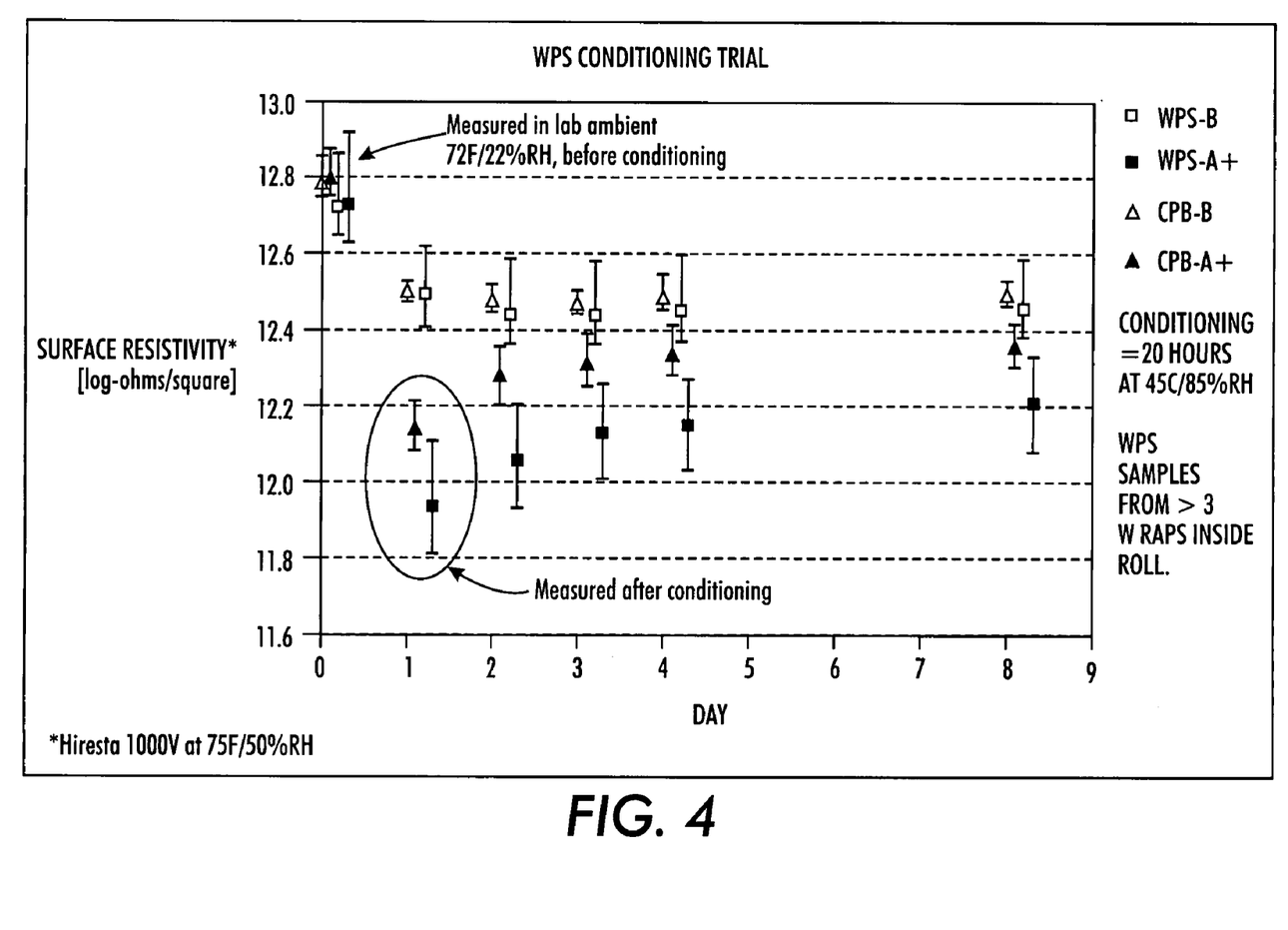
FIG. 4 is a graph of surface resistivity versus days, and demonstrates that the weldable belt, in embodiments, does not need conditioning.

Conditioning trials for weldable intermediate transfer belts was accomplished as follows. FIG. 4 demonstrates that unconditioned weldable intermediate transfer belts subjected to conditioning have a similar resistivity response as previously conditioned puzzle cut polyaniline filled polyimide belts. Because the conditioning step completes a non-reversible chemical reaction, once a belt has been conditioned any additional conditioning will have no permanent effect. Thus, if unconditioned belts behave similar to conditioned belts, then the conclusion can be drawn that conditioning is unnecessary. Shown in open triangles and closed triangles, the previously conditioned puzzle cut polyaniline filled polyimide belts of Example 4 behaves in the same fashion as the weldable material which is shown in open and closed squares.

FIG. 4 demonstrates that unconditioned weldable intermediate transfer belts subjected to conditioning, return to their original unconditioned value after several days. Unconditioned weldable belts are shown in open squares and conditioned weldable belts are shown in closed squares. The weldable material should have the same response to conditioning as previously conditioned material as prepared in Example 4. In other words, conditioning completes a chemical reaction in the materials from Example 4. Therefore, further conditioning should have no permanent effect. Shown in open triangles and closed triangles, the previously conditioned material of Example 4 behaves in the same fashion as the weldable material. Therefore, the conclusion is that the weldable material does not require conditioning.

While the invention has been described in detail with reference to specific and preferred embodiments, it will be appreciated that various modifications and variations will be apparent to the artisan. All such modifications and embodiments as may occur to one skilled in the art are intended to be within the scope of the appended claims.

We claim:

1. An intermediate transfer belt, comprising:
a belt substrate comprising primarily at least one polyaniline filled polyimide polymer; and
a non-interlocking welded seam.

2. The intermediate transfer belt of claim 1, wherein the seam is ultrasonically welded.

3. The intermediate transfer belt of claim 1, wherein the seam is a welded overlap seam.

4. The intermediate transfer belt of claim 3, wherein the belt substrate has a base thickness and the seam has a seam thickness, and wherein the seam thickness ranges from about 137 to about 163 percent of the base thickness.

5. The intermediate transfer belt of claim 3, wherein the belt substrate has a base thickness and the seam has a seam thickness, and wherein the seam thickness range is about 150 percent of the base thickness.

6. The intermediate transfer belt of claim 3, wherein the belt has a base thickness and the weld seam has a weld step, and wherein the weld step ranges from about 25 to about 57 percent of the base thickness.

7. The intermediate transfer belt of claim 3, wherein the belt has a base thickness and the weld seam has a weld step, and wherein the weld step is about 44 percent of the base thickness.

8. The intermediate transfer belt of claim 1, wherein the seam is a welded miter cut seam.

9. The intermediate transfer belt of claim 8, wherein the belt substrate has a base thickness and the seam has a seam thickness, and wherein the seam thickness ranges from about 125 to about 150 percent of the base thickness.

10. The intermediate transfer belt of claim 8, wherein the belt substrate has a base thickness and the seam has a seam thickness, and wherein the seam thickness range is about 138 percent of the base thickness.

11. The intermediate transfer belt of claim 8, wherein the belt has a base thickness and the weld seam has a weld step, and wherein the weld step ranges from about 18 to about 50 percent of the base thickness.

12. The intermediate transfer belt of claim 8, wherein the belt has a base thickness and the weld seam has a weld step, and wherein the weld step is about 25 percent of the base thickness.

13. The intermediate transfer belt of claim 1, wherein the belt substrate further comprises a polyaniline composition in an amount of from about 2 to about 25 percent by weight of total solids and thermoplastic polyimide in an amount of from about 75 to about 98 percent by weight of total solids.

14. The intermediate transfer belt of claim 1, further comprising a coating over the welded seam.

15. The intermediate transfer belt of claim 14, wherein the welded seam coating comprises polyvinyl chloride.

16. A process for welding an intermediate transfer belt including at least one polyaniline filled polyimide polymer, the process comprising:
mounting two non-interlocking end sections of an unseamed polyimide belt in proximity to a welding energy source;
moving the welding energy source into physical contact with at least one of the two end sections; and
imparting sufficient energy, with the welding energy source, to raise temperatures within at least a portion of the end sections above the glass transition temperature of the polyaniline filled polyimide polymer forming a non-interlocking welded seam.

17. An apparatus for forming images on a recording medium comprising:
a charge-retentive surface to receive an electrostatic latent image thereon;
a development component to apply toner to said charge-retentive surface to develop said electrostatic latent image and to form a developed image on said charge retentive surface;
an intermediate transfer belt, comprising a belt substrate that includes at least one polyaniline filled polyimide polymer; and a non-interlocking welded seam; and
a fixing component.

18. The welding process of claim 16, wherein the welding energy source comprises an ultrasonic welding horn.

19. The welding process of claim 16, further comprising overlapping the two non-interlocking end sections by between about 200 μm and about 500 μm.

20. The welding process of claim 18, wherein the ultrasonic welding horn vibrates at frequencies ranging from about 20 kilohertz to about 60 kilohertz.

21. The welding process of claim 18, wherein the ultrasonic welding horn vibrates at frequencies ranging from about 30 kilohertz to about 50 kilohertz.

22. The welding process of claim 18, wherein the stroke amplitude of the ultrasonic welding horn is between about 0.2 mils and about 2.0 mils.

23. The welding process of claim 18, wherein the stroke amplitude of the ultrasonic welding horn is between about 0.5 mils and about 1.5 mils.

24. The welding process of claim 18, wherein the stroke amplitude of the ultrasonic welding horn is about 0.8 mils.

25. The welding process of claim 16, wherein imparting energy further comprises imparting sufficient energy to raise the glass transition temperature across the overlap zone of the two non-interlocking end sections plus the weld splash zone.

26. The welding process of claim 18, further comprising providing an ultrasonic welding horn with an essentially horizontal landing zone.

27. The welding process of claim 18, further comprising moving the ultrasonic welding horn along the weld zone at a fly height less than the height of the end sections when overlapped.

28. The welding process of claim 18, wherein the fly height is between about 1.99 and about 2.01 mils greater than the thickness of one of the end sections.

29. The welding process of claim 18, further comprising applying a biasing pressure forces, with the ultrasonic welding horn, of between about one to about 6 pounds upon the mounted end sections.

30. The welding process of claim 29, wherein the biasing force is between about 2 to about 7 pounds.

31. The welding process of claim 29, wherein the biasing force is about 3 pounds.

32. The welding process of claim 16, further comprising removing heat from the welding zone after the glass transition temperature has been reached.

33. The welding process of claim 32, wherein an ultrasonic welding horn having further comprising using an ultrasonic welding horn a thermal conductivity greater than about 230 watts/meter degrees centigrade.

34. The welding process of claim 32, wherein an ultrasonic welding horn having further comprising using an ultrasonic welding horn a thermal conductivity greater than about 245 watts/meter degrees centigrade.

* * * * *